United States Patent [19]

Sahm et al.

[11] 3,928,390

[45] Dec. 23, 1975

[54] CERTAIN 2-SUBSTITUTED PHENYL AND SUBSTITUTED NAPHTHYL BENZOFURANS

[75] Inventors: Wilfried Sahm, Kelkheim, Taunus; Gunter Rosch, Altenhain, Taunus, both of Germany

[73] Assignee: Hoechst Aktiengesellschaft, Frankfurt, Germany

[22] Filed: Aug. 10, 1972

[21] Appl. No.: 279,735

[30] Foreign Application Priority Data

Aug. 13, 1971 Switzerland...................... 11925/71

[52] U.S. Cl....... 260/346.2 R; 8/1 W; 252/301.2 W; 260/346.2 M; 260/247.1 E; 260/247.2 A; 260/268 BC; 260/294.8 C; 260/332.2 C; 260/297 B
[51] Int. Cl.$^2$................ C07D 307/85; C07D 307/92
[58] Field of Search............. 260/346.2 R, 346.2 M

[56] References Cited

FOREIGN PATENTS OR APPLICATIONS

| 970,937 | 9/1964 | United Kingdom |
| 1,008,260 | 10/1965 | United Kingdom |
| 1,037,643 | 8/1966 | United Kingdom |
| 1,041,525 | 9/1966 | United Kingdom |
| 1,224,664 | 3/1971 | United Kingdom |
| 1,236,812 | 6/1971 | United Kingdom |

*Primary Examiner*—John D. Randolph
*Assistant Examiner*—Bernard I. Dentz
*Attorney, Agent, or Firm*—Connolly and Hutz

[57] ABSTRACT

Novel benzofurane compounds are obtained by intramolecular condensation reactions of the corresponding ketones. The products are useful as optical brighteners.

5 Claims, No Drawings

CERTAIN 2-SUBSTITUTED PHENYL AND SUBSTITUTED NAPHTHYL BENZOFURANS

It is already known to prepare benzofurane derivatives which contain in 2-position a phenyl or optionally substituted benzazolyl, oxdiazolyl, pyrazolinyl or stilbyl radical. It is furthermore known that these compounds are used as optical brighteners for organic materials (French Patent No. 1.562.477, German Offenlegungsschriften 2.031.819 and 2.031.744).

The present invention relates to benzofurane derivatives which have a slightly yellow color and show in dissolved form a violet blue to greenish blue fluorescence and correspond to the formula (1)

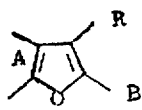

In this formula
   A represents an aromatic mono- or polynuclear ring system, wherein two adjacent carbon atoms are condensed in the manner indicated with the furane nucleus,
   R represents a hydrogen atom, a lower alkyl group, a phenyl group which is optionally substituted by lower alkyl or alkoxy groups or halogen atoms as well as a carboxy group or its functional derivatives and
   B stands for one of the following monovalent aromatic groups:

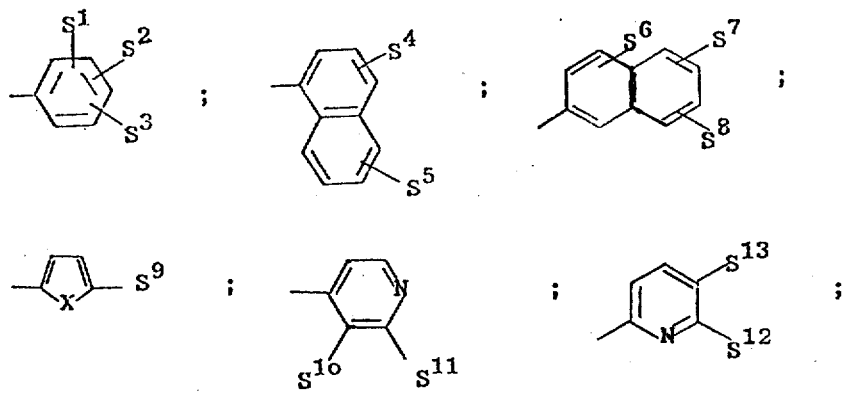

(The substituents $S^1$ to $S^{13}$ are defined below).

Non chromophoric substituents may be bound to the aromatic ring system A, such as halogen atoms, alkyl, alkylene, alkoxy, alkenyl, aryl, optionally modified carboxy or sulfo groups, acyl, acylamino or sulfonyl groups. Several of the mentioned groups, which may be identical or different from one another, may be bound simultaneously to A.

A "modified" carboxy group or "its functional derivatives" means first of all the salts of this group formed with colorless cations, alkali metal or ammonium ions being preferred, and furthermore such derivatives of a carboxy group, from the carbon atom of which three bonds lead to hetero atoms, especially the cyano group, a carboxylic acid ester group or a carboxylic acid amide group.

Carboxylic acid ester groups are especially those having the general formula $COOR^1$, in which $R^1$ represents a phenyl radical or an optionally branched lower alkyl group, which radicals may contain further substituents such as a preferably low-molecular dialkylamino, trialkyl ammonium or an alkoxy group. A carboxylic acid amide group is especially a group having the formula $CONR^2R^3$, in which the radicals $R^2$ and $R^3$ represent hydrogen atoms or lower, optionally substituted alkyl groups which may form with the nitrogen atom a hydroaromatic radical, such as a piperidino, morpholino or piperazino group, furthermore acid hydrazides and the analogous thioderivatives.

A "modified" sulfo group or "its functional derivatives" - in analogy to the preceding explanations - represents the salts of this group formed with colorless cations, preferably alkali metal or ammonium ions and furthermore the derivatives, in which the $SO_2$ group is bound to a hetero atom, as in the sulfonic acid ester group and in the sulfonamide group. A sulfonic acid ester group especially means a group of the formula $SO_2OR^1$, wherein $R^1$ has the above meaning, and sulfonic acid amide group means a group of the formula $SO_2NR^2R^3$, in which $R^2$ and $R^3$ have the above-mentioned meaning.

An acyl group is especially a group of the formula $COR^4$, wherein $R^4$ represents an optionally substituted, preferably lower alkyl or phenyl radical.

A sulfonyl radical is especially a radical having the formula $SO_2R^5$, wherein $R^5$ stands for an optionally substituted lower alkyl or phenyl group; these groups may preferably contain as substituents a lower dialkylamino, trialkyl ammonium, acylamino or sulfo group.

Considering the definitions given for A and R, there are obtained in connexion with the radical B the following compounds of the formula (1) described herein in a more detailed way and corresponding to the formulae:

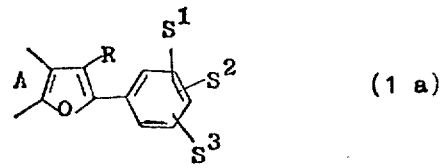

(1 a)

wherein $S^1$, $S^2$ and $S^3$ represent hydrogen or halogen atoms, lower alkyl groups, phenyl groups optionally substituted by non-chromophoric radicals, optionally modified carboxy or sulfo groups, acyl, acylamino, sulfone, lower alkoxy, lower dialkylamino or lower trialkyl ammonium groups. If all of the substituents $S^1$, $S^2$, $S^3$ and R represent hydrogen or a lower alkyl group, the molecule simultaneously contains at least one of the other groups mentioned;

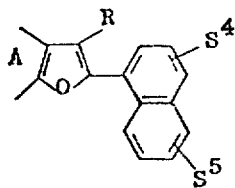

wherein $S^4$ and $S^5$ have the meaning described for $S^1$, $S^2$ and $S^3$, wherein the hydrogen atoms and alkyl groups may be present without the other groups being simultaneously present;

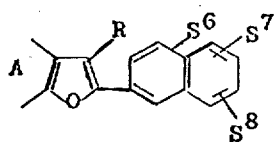

wherein $S^6$, $S^7$ and $S^8$ have the meanings described for $S^1$, $S^2$ and $S^3$, the proviso given for $S^4$ and $S^5$ with regard to the alkyl groups and hydrogen atoms being also valid in this case, i.e. other substituents are not mandatory in this case;

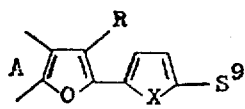

wherein $S^9$ stands for a hydrogen atom, for a phenyl group substituted by nonchromophoric radicals and an optionally modified carboxy or sulfo group and X means an oxygen or a sulfur atom:

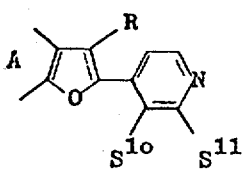 (1e) and 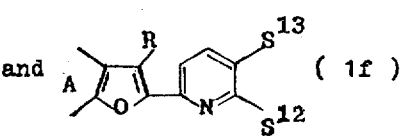

wherein $S^{10}$, $S^{11}$, $S^{12}$ and $S^{13}$ represent hydrogen or chlorine atoms, or $S^{10}$ and $S^{11}$ together and $S^{12}$ and $S^{13}$ together form an annellated benzene nucleus, furthermore the salts thereof formed with organic and mineral acids and the quaternization products thereof.

Among the compounds of the general formula (1) there are especially interesting those having the general formula (2)

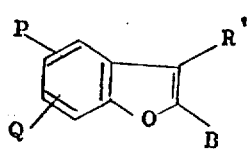

wherein P and Q represent hydrogen or halogen atoms, lower alkyl or alkoxy groups, phenyl groups, optionally modified sulfo groups or P and Q form together, especially if they are in 4 or 5-position a lower alkylene group or an annellated benzene nucleus.

R' is a hydrogen atom, a lower alkyl group or the phenyl group and B has the above meaning.

Preferred compounds are those of the general formula (2), in which P and Q form together an annellated benzene nucleus, and B represents a mono-nuclear aromatic carbocyclic or heterocyclic system and the compounds wherein P and Q represent hydrogen atoms, lower alkyl, alkoxy, optionally modified sulfo or phenyl groups or P and Q together represent a lower alkylene group and B is a binuclear aromatic carbocyclic or heterocyclic system.

The term "lower" whenever used in connection with an aliphatic group is intended to cover such radicals having up to about 6, especially up to 4, carbon atoms, i.e. alkyl or alkoxy of 1 to 4 carbon atoms or alkenyl of 2 to 4 carbon atoms.

The new benzofuranes partly show a much stronger optical brightening effect than compounds already known belonging to this group of substances.

Particularly valuable are the compounds of the general formula (2), wherein the groups linked to the radical B are attracting electrons, and are directly conjugated with the electron system of the benzofurane molecule. As electron-attracting groups there are considered besides phenyl, acyl, sulfone or sulfo groups the optionally modified carboxy groups.

The benzofurane derivatives of the general formula (1) may be prepared i.a. according to the following new process, which comprises condensing intramolecularly compounds of the general formula (3)

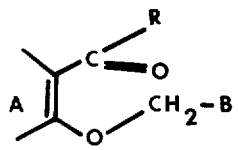

In the formula (3) A, B and R have the meaning indicated in the general formula (1).

The ring closure is carried out in the presence of strongly polar solvents. There may be mentioned the following examples without any restriction being made: dimethyl formamide, dimethyl acetamide and hexamethyl phosphoric acid trisamide. Mixtures of suitable solvents may also be used. As strongly basic condensation agents there are considered i.a. alkali metals, alkaline earth metals, strongly alkaline compounds thereof and strongly basic aluminium compounds, for example, hydroxides, alcoholates, amides or hydrides. The corresponding sodium or potassium compounds are preferably used, for example potassium hydroxide, potassium-t-butylate or sodium hydroxide. A mixture of different bases may also be used. The basic condensation agents are mostly used in the stoichiometric amount, partly in excess, for example in up to ten times the equivalent amount.

The reaction temperature ranges between about 10° and about 250°C, preferably between about 20° and about 160°C. The reaction is preferably carried out under exclusion of atmospheric oxygen. A further process of preparation consists in condensing intramolecularly compounds of the general formula (3b)

(3b)
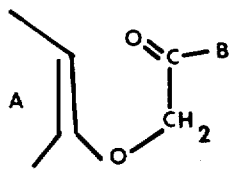

whereby the radical B migrates into the 2-position of the furane ring formed. In the formula (3b) A and B have the meaning indicated in defining the general formula (1). The process has the restriction, that only the compounds of the general formula (1) may be prepared, in which R = H. The process is preferably carried out in the presence of acidic condensation agents, preferably polyphosphoric acid. The reaction temperature ranges between about 50°C and 230°C, preferably between about 80°C and about 180°C, depending on the type of the starting materials.

The reaction products of the preceding processes may be subjected of course- to further modifications known per se, as for example to oxidations, reductions, substitutions, sulfonations with sulfonating agents, such as H₂SO₄, mixtures of H₂SO₄ and SO₃ or chloro-sulfonic acid, moreover, modifications which - starting from molecules containing sulfo or carboxy groups - lead to compounds having functionally modified sulfo or carboxy groups or the conversions of such groups into other groups of this type or into the free acids. The use of the compounds described by the general formulae (3) and (3b) together with the radicals A, R and B defined in formula (1) allows to prepare for example the following compounds:

( 4 )

(5)

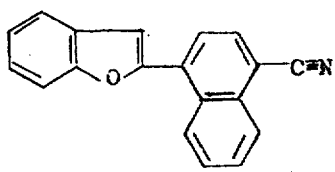

(5a)

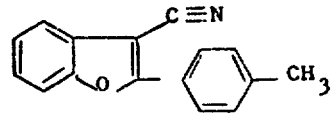

(6)

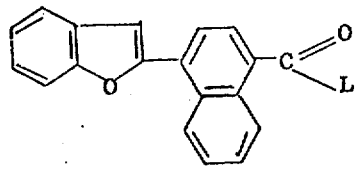

$L = OH, OCH_3, OC_2H_5, OC_3H_7,$
$OC_4H_9, OC_8H_{17}, OC_{12}H_{25},$
$OCH_2CH_2N(CH_3)_2,$
$OCH_2CH_2N(CH_3)_3{}^+CH_3OSO_3{}^-,$
$NH_2, N(CH_3)_2, CH_3, C_6H_5, ONa,$
$-NH-NH_2, O-CH_2-CH=CH_2,$
$O-CH_2-\underset{CH_3}{\overset{|}{C}}=CH_2$ ( 7 )

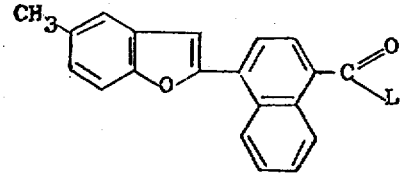

L = cf. compound (6)

( 8 )

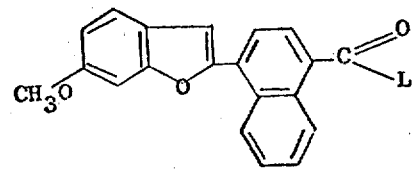

L = cf. compound (6)

( 9 )
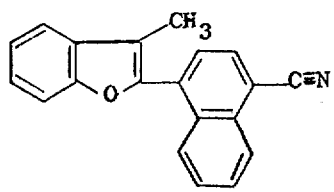
( 14 )
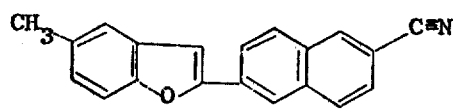
( 15 )
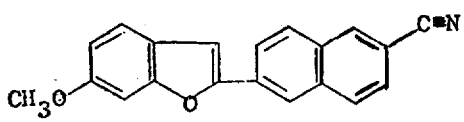
( 10 )
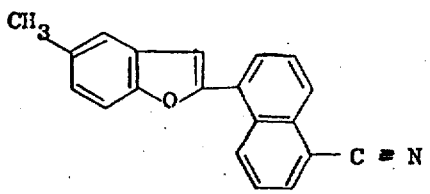
L. = cf. compound (6)
( 16 )
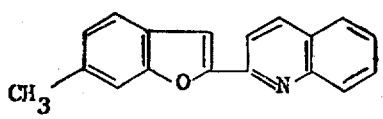
( 11 )
( 17 )
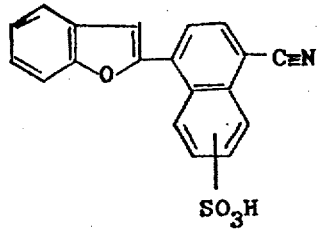
( 12 )
( 17b )
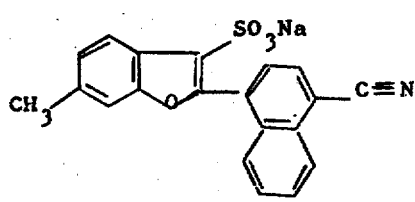
( 13 )
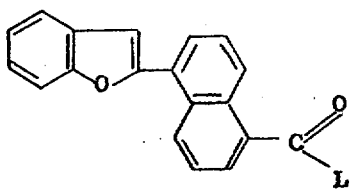
L = cf. compound (6)
( 18 )
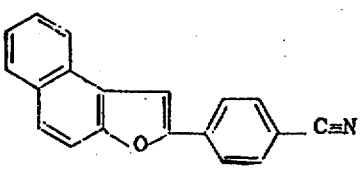

( 19 )

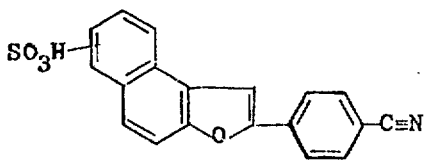

( 24 )

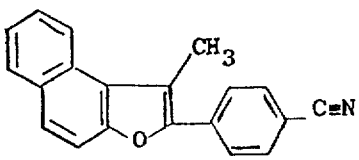

( 20 )

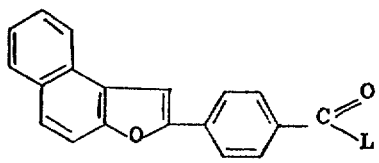

L.   cf. compound (6)

( 25 )

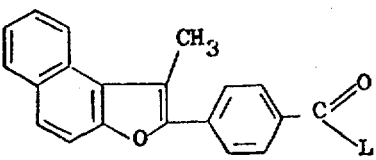

L. =   cf. compound (6)

( 21 )

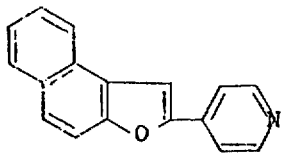

( 22 )

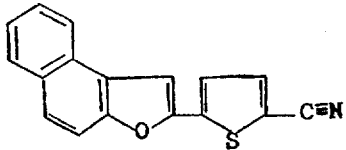

( 23 )

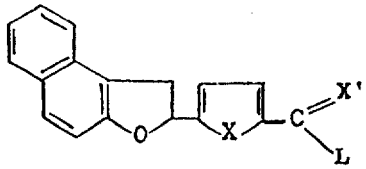

L. =   cf. compound (6)

X, X' = S, O

The new compounds according to the invention have a wide field of application. They serve above all for the optical brightening of different natural and synthetic organic materials; they also include organic materials which may be used for finishing mineral materials, for example inorganic pigments.

The substrates to be brightened are for example the following materials: lacquers, synthetic fibres such as for example consisting of acetyl cellulose, linear polyesters, polyolefines, polyvinyl chloride, polyvinylidene chloride or polyacrylo-nitrile as well as foils, films, ribbons or shaped articles made of such materials.

If the compounds according to the invention are insoluble in water, they may be used in dissolved form in organic solvents, preferably by means of a dispersing agent, or in an aqueous dispersion. There are considered for example as dispersing agents: soaps, polyglycol ethers deriving from fatty alcohols, fatty amines or alkyl phenols, cellulose sulfite waste liquors or condensation products of optionally alkylated naphthalene sulfonic acids with formaldehyde.

The water-soluble anionic compounds accordiing to the invention are particularly suitable for the optical brightening of native and regenerated cellulose fibres and of wool and synthetic polyamide fibres.

The water-soluble cationic compounds according to the invention are particularly suitable for the optical brightening of mixed polymers of acrylonitrile, especially the commercial copolymers having a contents of at least 85 % of acrylonitrile.

Benzofuranes of the general formula (1) may also be added to detergents. The latter ones may contain the usual fillers and auxiliaries such as alkali silicates, alkali polyphosphates and alkali polymethaphosphates, alkali borates, alkali salts of carboxy-methyl cellulose, foam stabilizers, as for example alkanol amides of higher fatty acids or complex formers, such as soluble salts of the ethylene-diamine tetraacetic acid or diethylene triamine-pentaacetic acid as well as chemical bleaching agents, as for example perborates or percarbonates, perborate activators or disinfectants.

The fibre material is brightened with the aqueous or, if desired, organic brightening liquor by the exhaustion process at temperatures reaching preferably from about 20° to about 150°C or under thermosol conditions.

Furthermore, the compounds according to the invention may be added to high-molecular organic materials before or during their shaping. Thus, they may be added to the molding materials in the preparation of films, foils, ribbons or shaped articles or be dissolved in the spinning mass before the spinning process. Suitable compounds may also be added to the low-molecular-weight starting materials before polycondensation or polymerization, as in the case of polyamide-6, polyamide-6,6 or linear esters of the polyethylene glycol terephthalate type.

Olefinically unsaturated compounds according to the invention which contain additionally to the fluorescent system, one olefinic double bond capable of being polymerized, may be used for preparing fluorescent polymers or polymer mixtures, by polymerizing them as such or in mixture with other monomer or polymer vinyl compounds, maintaining the fluorescent system. These fluorescent polymers may be subsequently mixed with not fluorescent polymers. Polymers optically brightened in this manner are characterized by a high degree of whiteness. Furthermore, the chemical bond of the brightening molecules with the polymers insures a good fastness to sublimation and to solvents.

Compounds according to the invention substituted by one or preferably two carboxy or carbo-alkoxy groups, may be bound to linear polyester molecules and synthetic polyamides by an ester or amide bond, if they are added to these materials or preferably to their starting compounds under suitable conditions. The brighteners linked in this way to the substrate by a chemical bond are characterized by an extremely high fastness to sublimation and to solvents.

The amount of the novel compounds calculated on the material to be optionally brightened, may vary within wide limits, according to the field of application and to the effect desired. It may be easily determined by tests and generally ranges between about 0.01 and about 2 %.

The following Examples illustrate the invention.

EXAMPLE 1

14.35 g of 1-formyl-2-(4-cyano-benzyloxy)-naphthalene (melting point: 163° – 163.5°C) were dissolved in 150 ml of dimethyl formamide (in the following DMF). Then 8.4 g of potassium hydroxide (powder, about 90 % strength) were added. The suspension was stirred for 1 hour at room temperature. The mixture was poured onto 1.5 liters of ice water, the pH value was adjusted to 5 – 7 with concentrated HCl and the precipitate formed was suction-filtered. This filter residue was washed with water and dried. Thus, 13.2 g of the crude product having a melting point of 160° – 163°C were obtained. It was redissolved from 200 ml of n-butanol under addition of charcoal. 9.5 g of a very pure 2-(p-cyano-phenyl)-naphthofurane of the formula

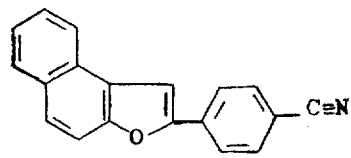

(101)

crystallized in the form of a yellow crystals having a melting point of 173° to 175°C.

By reacting (101) at 60°C with concentrated $H_2SO_4$, the sulfonate

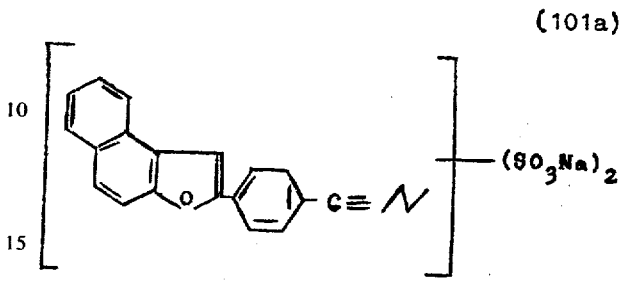

(101a)

was obtained; λ max (absorption $H_2O$) = 351 nm.

EXAMPLE 2:

9.6 g of 1-formyl-2-(4-carbomethoxy-benzyloxy)-naphthalene (melting point: 163° – 165°C) in 100 ml of DMF were mixed at room temperature with 3.36 g of potassium hydroxide (powder, about 80 % strength). The whole was stirred for 60 minutes at 70°C, cooled with ice and introduced while stirring into 300 ml of 1N HCl cooled with ice. After 15 minutes, the product was suction-filtered, washed free from chlorine ions and dried in vacuo at 60°C. Thus, 8.8 g of crude product of the formula

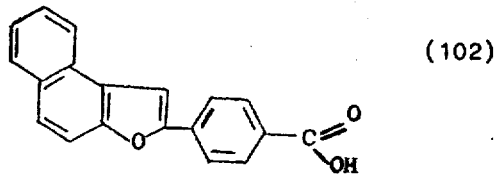

(102)

were obtained in the form of a whitish yellow powder having a melting point of 283° – 287°C, after recrystallization from trichloro-benzene. The melting point was 301° – 303°C.

EXAMPLE 3:

7.2 g of the compound (102) were dissolved in 40 ml of chlorobenzene and mixed with 3 ml of thionyl chloride and 0.5 ml of DMF. Then the mixture was stirred for 1 hour at 70°C and for 1.5 hours at 90°C. It was cooled in an ice bath, the light yellow crystalline precipitate was suction-filtered, washed with a small amount of benzene and dried at room temperature in vacuo. Thus, 5.3 g of analytically pure substance were obtained, having the formula

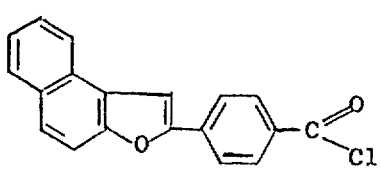

(103)

and a melting point of 265° to 266°C.

EXAMPLE 4:

30.6 g of the compound (103) were dissolved at the boil in 300 ml of benzene. Then a solution of 10 g of dimethylaminoethanol in 50 ml of benzene was added dropwise and stirring was continued for 30 minutes at the boiling temperature. The precipitate formed was suction-filtered, washed with benzene and dried in vacuo at 60°C. Thus, 34.4 g of the substance of the formula

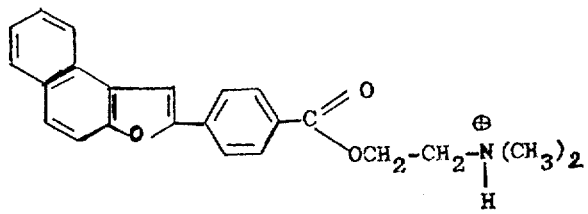

were obtained in the form of yellow crystals with λ max (absorption/$H_2O$) = 351 nm.

EXAMPLE 5:

28 g of the compound (104) were dissolved to a large extent in 500 ml of water. Then the whole was titrated with 2N NaOH until the reaction was slightly alkaline. It was stirred with 500 ml of chloroform, the organic phase was dried with potash after separation and concentrated in vacuo. The remaining oil which rapidly crystallized was recrystallized from 150 ml of n-butanol. Thus 19.1 g of the pure slightly yellow compound of the formula

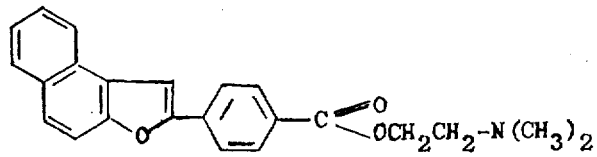

having a melting point of 112°C were obtained.

EXAMPLE 6:

7.16 g of the compound (105) were dissolved at 30°C in 250 ml of acetone. At this temperature a solution of 2.7 g of dimethyl sulfate in 50 ml of acetone was introduced while stirring. A slightly yellow substance crystallized. It was suction-filtered, washed with methanol and dried in vacuo at 60°C. Thus 8.5 g of the compound of the formula

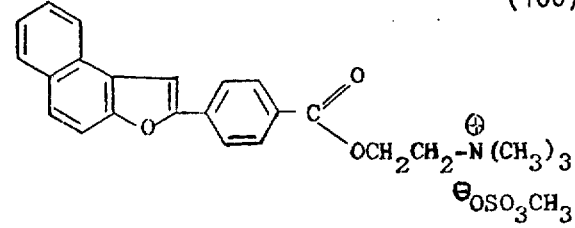

were obtained, λ max (absorption/DMF) = 352 nm.

EXAMPLE 7:

5.9 g of the compound (103) were heated to the boil in 100 ml of methanol for three hours under addition of 5 ml of pyridine. The mixture was cooled in the ice bath, and the crystallized product obtained was suction-filtered. Thus, 5.2 g of a crude product of the formula

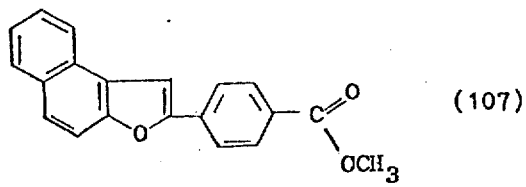

having a melting point of 194° – 196°C were obtained, which was recrystallized from 150 ml of N-butanol and then had a melting point of 200°C.

EXAMPLE 8:

4.9 g of 1-bromo-methyl-4-cyano-naphthalene were heated to the boil together with 2.9 g of salicyl aldehyde sodium in 50 ml of DMF for 15 minutes. The mixture was cooled in the ice bath, and at 10°C, 1.4 g of potassium hydroxide (powder, about 80 % strength) were added, and the mixture was stirred for 10 minutes at room temperature. Then the whole was poured onto a mixture of 100 ml of ice water and 50 ml of methanol and adjusted to neutral with 2N HCl. The precipitate was suction-filtered and washed with water. After drying in vacuo at 60°C, 5.1 g of the crude product of the formula

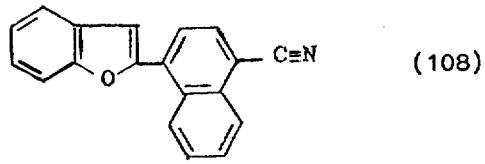

were obtained having a melting point of 126° – 128°C. The product was recrystallized from 50 ml of n-butanol under addition of charcoal. Thus, 4.2 g of a pure product having a melting point of 127° – 128°C were obtained.

By sulfonating the compound (108) in analogy to Example 1, the compound

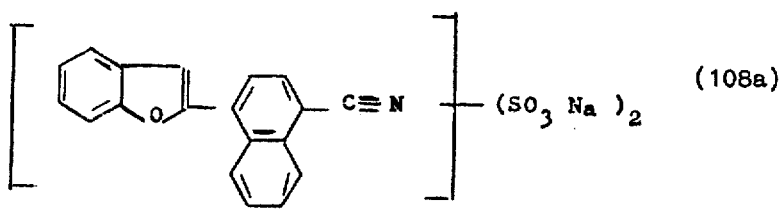
(108a)

was obtained, λ max (absorption/H₂O) = 355 nm.

EXAMPLE 9:

27.9 g of 4-carbomethoxy-1-bromomethyl naphthalene and 14.5 g of salicyl aldehyde sodium were heated to the boil in 150 ml of DMF for 30 minutes. Then the mixture was cooled in the ice bath and 15 g of potassium hydroxide (powdered, about 90 % strength) were added. The mixture was heated for 1 hour to 70°C, subsequently cooled, and the reaction mixture was introduced while stirring into 500 ml of 1N hydrochloric acid. The precipitate was suction-filtered, washed with water until it was free from chlorine ions and dried in vacuo at 60°C. Thus, 25.6 g of the crude product of the formula

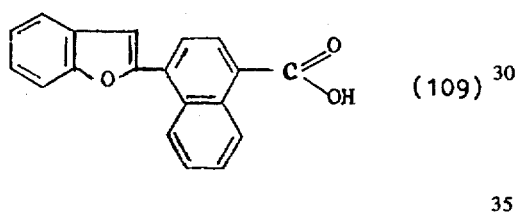
(109)

were obtained having a melting point of 210° – 220°C. By recrystallization from nitrobenzene the product could be purified; the melting point was 222° – 223°C.

EXAMPLE 10:

14.4 g of the compound (109) were dissolved in 50 ml of chloro-benzene and mixed with 6 ml of thionyl chloride and 5 drops of DMF. The whole was heated for 1 hour to 60°C and for another 2 hours to 110°C. Thus, a solution of the compound

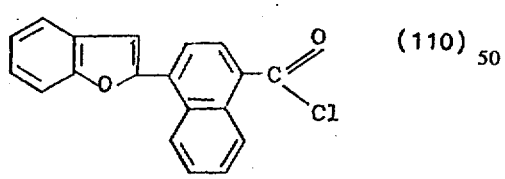
(110)

was obtained, which could be used for further reactions without any further working up.

EXAMPLE 11:

A solution containing 30 g of the carboxylic acid chloride (110) according to Example 10, was mixed at 80°C with 10 g of dimethyl-amino ethanol. The precipitate formed was suction-filtered, washed with benzene and dried in vacuo at 60°C. By this way 29 g of a substance of the formula

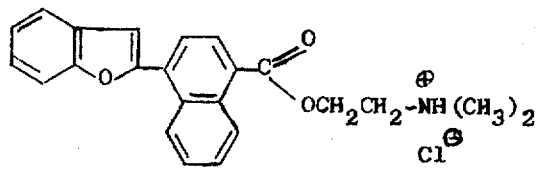
(111)

were obtained; λ max (absorption/H₂O) = 346 nm.

EXAMPLE 12:

In analogy to Example 5, the compound

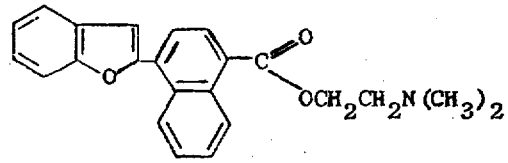
(112)

was obtained from the compound (111) by treating it with 2N NaOH. The melting point was 63° – 64°C.

EXAMPLE 13:

When compound (112) was treated in analogy to Example 6 with dimethyl sulfate in acetone, the compound

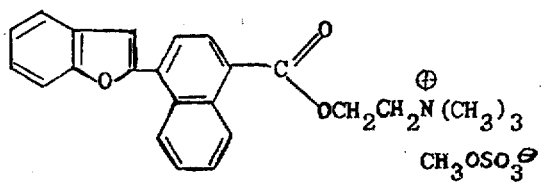
(113)

was obtained; λ max (absorption/H₂O) = 346 nm.

The following compounds may be prepared in analogy to the preceding Examples:

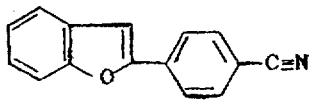

melting point
141-143°C      (114)

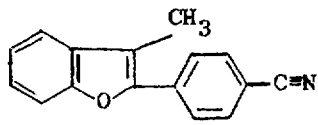

melting point
140-142°C      (115)

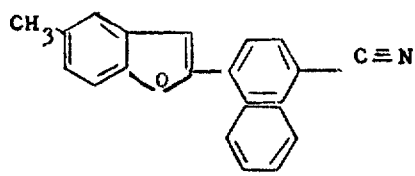

melting point
195°C      (116)

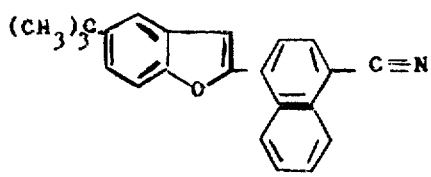

melting point
140°C      (117)

EXAMPLE 14:

A fabric made of polyethylene glycol terephthalate was treated in a goods-to-liquor ratio of 1:25 with a washing liquor, which contained 6g/l of a detergent having the following composition:
  9.8% of isotridecanol-polyglycol ether with, on an average,
  8 mols of ethylene oxide per mole of isotridecanol
  30 % of sodium tripolyphosphate
  15 % of tetrasodium pyrophosphate
  5 % of sodium metasilicate
  2 % of carboxymethyl cellulose (1500 p)
  38 % of sodium sulfate
  0.2% of the compound of the formula (108)

The fabric was washed at 60°C for 10 minutes, rinsed and dried. This treatment was repeated up to 5 times.

The fabric showed an excellent degree of whiteness (determined according to A. Berger, Die Farbe 8 (1959) 187 ff) and a distinct increase as compared with the untreated material:
  Untreated good 82.4 %
  Washed once 92.0 %
  Washed five times 98.1 %

Also a very good effect was obtained when the compounds (116) and (117) were used.

EXAMPLE 15:

A fabric consisting of a commercial mixed polymer of polyacrylonitrile (containing at least 85 % of acrylonitrile) was treated on a winch machine with a bath containing 0.3 % of the optical brightener of the formula (113) and 2 g/l of sodium chlorite. The pH value of the bath was adjusted to 4 with formic acid. The cold bath was heated to 90°C within 45 minutes and maintained for 30 minutes at this temperature. After cooling and rinsing the fabric showed an excellent degree of whiteness of a bluish shade. The degree of whiteness (according to Berger) amounted to 98.8 % as compared with 50.6% of the non-treated material.

EXAMPLE 16:

A yarn material containing at least 85 % of polyacrylonitrile was treated with a bath containing 0.2 % of the optical brightener of the formula (104) and which was adjusted to pH 4 with formic acid. The goods-to-liquor ratio amounted to 1:40. The yarn was introduced at 60°C and heated within 30 minutes to the boil. After a 30 minutes treatment the material was washed as usual at decreasing temperatures and dried.

The material thus treated showed a degree of whiteness of 124.1 % as compared with 65.3 % of the untreated good.

EXAMPLE 17:

A knitted fabric made of textured polyamide 6 was treated in a bath in the ratio of 1:12, which contained 0.2 g/l of the compound (101) and 0.3 g/l of a commercial wetting agent on the basis of an oxethylated fatty alcohol having an alkyl radical of, on an average, 8 carbon atoms and, on an average, 12 ethylene glycol ether units in the molecule. The material was treated in this solution for 30 minutes at 120°C and then rinsed and dried as usual.

The polyamide fabric showed an excellent degree of whiteness (according to Berger) of 120.1 % as compared with 58.9 % of the untreated material. Similar good effects were obtained, when the compounds (101a) and (108a) were used.

EXAMPLE 18:

A card sliver consisting of at least 85 % of polyacrylonitrile was treated with a bleaching liquor, which contained as an optical brightener a compound of the formula (106). The pH value of the solution was adjusted to 3 with oxalic acid. Furthermore, 1.5 g/l of a condensation product of stearic acid and an addition product of 4 mols of ethylene oxide to ammonia as well as 2 g/l of a quarternated condensation product of diethylene triamine and stearic acid were added to this padding liquor. After impregnating with this solution, the card sliver was squeezed off between rollers to a contents of moisture of about 100 % and treated with a suitable steamer for 3 minutes with saturated steam of 100°C. The material thus brightened showed an excellent degree of whiteness of 113.3 % which was much superior to the degree of 65.3 % of the not treated material.

EXAMPLE 19:

1000 Parts by weight of ε-caprolactame were melted at about 100°C in a glass apparatus continuously maintained under nitrogen provided with a steel stirrer and a descending cooler. Calculated on the amount of caprolactame used, 0.08 % by weight of the compound (101) and 0.34 % by weight of a 12 % aqueous $TiO_2$-suspension were added. The mixture was heated while stirring for 1 hour to 175° – 180°C. After one hour the temperature was further increased to 275°C and the whole was stirred for about 5 hours at this temperature. At the end of the reaction time, a stronger stream of nitrogen was introduced, in order to distill off the lactame in excess. The polyamide melt thus prepared was passed through a slot die having the form of a ribbon, cooled rapidly in water, chipped and dried.

A fabric obtained from this polycondensate by spinning and knitting showed a much better degree of whiteness of a good fastness to light than a fabric prepared in the same manner, but without addition of a brightener.

EXAMPLE 20:

In a glass apparatus provided with a stirrer, a gas inlet pipe, a vacuum device and a descending cooler, 400 g of dimethyl terephthalate, 310 g of ethylene glycol and 0.5 g of antimony oxide were heated under nitrogen to an external temperature of about 200°C. This temperature was maintained for 3 hours, while methanol slowly distilled off. Then 0.4 g of the compound (107) and 20 g of a 20 % $TiO_2$ suspension in ethylene glycol were added, the external temperature was increased to 285°C, and while slowly reducing the pressure to 0.2 mm of mercury, the ethylene glycol was distilled off in the course of 3 hours. The bloc of optically brightened polyester material obtained thereby after cooling was comminuted, granulated and spun to threads in usual manner or pressed to foils.

The threads or foils thus obtained had a brilliant appearance and a very good fastness to light.

Instead of the compound (107), the compounds (105) or (112) may also be used with the same good results.

We claim:
1. A compound fo the formula

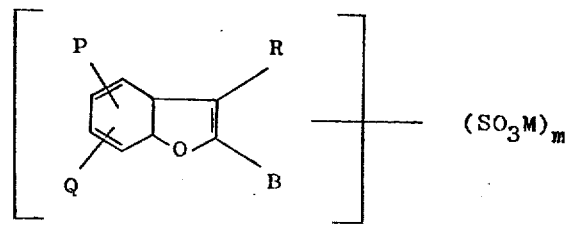

in which
P and Q, which are equal or different, are hydrogen, halogen, lower alkyl, lower alkoxy, phenyl, sulfo or its alkali metal salt or P and Q together are lower alkylene or an annellated benzene nucleus;
R is hydrogen or lower alkyl;
B is cyanophenyl, cyanonaphthyl, carboxyphenyl, carboxynaphthyl, lower carboalkoxy-phenyl, lower carboalkoxynaphthyl or lower carboalkoxyphenyl or -naphthyl being substituted in the alkyl moiety by di-(lower alkyl) amino;
M is hydrogen or alkali metal and
m is a number from zero to 4.

2. A compound as claimed in claim 1, wherein R is hydrogen.

3. A compound as claimed in claim 1, wherein P and Q are hydrogen, or together an annellated benzene nucleus.

4. The compound as claimed in claim 1, wherein P and Q are hydrogen, B is 4-cyano-1-naphthyl, m is 2 and R is hydrogen.

5. The compound as claimed in claim 1, wherein P and Q together are a benzene ring annellated in 4,5-position, B is p-cyanophenyl, m is zero and R is hydrogen.

* * * * *